United States Patent [19]

Ruyter et al.

[11] Patent Number: 5,334,445

[45] Date of Patent: Aug. 2, 1994

[54] CELLULOSIC FIBROUS AGGREGATE AND A PROCESS FOR ITS PREPARATION

[75] Inventors: Herman P. Ruyter; Anton Hortulanus; Jan Dekker, all of Amsterdam, Netherlands

[73] Assignee: Shell Oil Company, Houston, Tex.

[21] Appl. No.: 448,101

[22] Filed: Dec. 13, 1989

[30] Foreign Application Priority Data

Dec. 16, 1988 [GB] United Kingdom ............... 8829445
Feb. 10, 1989 [GB] United Kingdom ............. 8903012.6

[51] Int. Cl.$^5$ ............................................... D04H 1/58
[52] U.S. Cl. ........................... 428/284; 144/361; 144/364; 144/380; 156/62.2; 156/62.6; 156/334; 428/288; 428/357; 428/359
[58] Field of Search .............. 428/280, 296, 224, 284, 428/286, 249, 288, 359, 357; 8/125; 144/380, 361, 364; 156/62.6, 62.2, 334

[56] References Cited

U.S. PATENT DOCUMENTS

| | | |
|---|---|---|
| 2,495,282 | 1/1950 | Pinkney . |
| 2,642,371 | 6/1953 | Fahrni . |
| 3,021,244 | 2/1962 | Meiler . |
| 3,282,313 | 11/1966 | Schuerch ............... 144/380 |
| 4,007,312 | 2/1977 | Stofko et al. . |
| 4,061,819 | 12/1977 | Barnes . |
| 4,163,840 | 8/1979 | Geyer et al. ..................... 8/125 |
| 4,255,477 | 3/1981 | Holman . |
| 4,500,594 | 2/1985 | Credali et al. . |
| 4,569,873 | 2/1986 | Robbins . |
| 4,610,913 | 9/1986 | Barnes . |
| 4,751,131 | 6/1988 | Barnes . |
| 4,942,081 | 7/1990 | Reiniger ........................... 428/296 |
| 5,017,319 | 5/1991 | Shen . |

FOREIGN PATENT DOCUMENTS

0497477 12/1938 United Kingdom .

*Primary Examiner*—James J. Bell

[57] ABSTRACT

A cellulosic fibrous aggregate formed from sections of cellulosic fibrous material by a process which comprises:

a softening stage comprising softening a plurality of sections of cellulosic fibrous material by the action of an aqueous softening agent at elevated temperature, thereby at least partially breaking down the cellulosic cross-linking in the cellulosic fibrous material;

a compression stage comprising pressing together the softened sections of cellulosic fibrous material to form a compressed matrix; and a consolidation stage comprising dewatering and consolidating the compressed matrix to form a consolidated matrix, and a process for its preparation comprising the aforementioned softening, compression and consolidation stages.

22 Claims, No Drawings

CELLULOSIC FIBROUS AGGREGATE AND A PROCESS FOR ITS PREPARATION

CROSS-REFERENCE TO RELATED APPLICATION

This application discloses subject matter which relates to the subject matter disclosed in copending application, Ser. No. 07/448,091, filed Dec. 13, 1989.

The present invention relates to a cellulosic fibrous aggregate, in particular a light wood aggregate, and a process for its preparation.

The terms "light wood" and "heavy wood" as used in this specification refer to wood which is respectively of relatively low density and relatively high density. The terms are not necessarily synonymous with the terms "softwood" and "hardwood", the latter being understood by persons skilled in the art to refer to wood from needle-bearing and deciduous trees respectively.

Solid wood products are traditionally made by the cutting, for example by sawing, of sections of trees cut to the desired length yielding a variety of square or rectangular sections. The mechanical properties of the end product are thus directly comparable to those of the starting material. The economic and technical constraints of the aforementioned cutting operation are such that sections of trees having a minimum diameter of the order of 20 cm are required. Furthermore, wood products consisting of heavy wood of relatively high density, for example teak and mahogany, owing to their superior mechanical properties command the highest commercial values and are much in demand. However, such trees are generally very slow growing and need many years to reach the desired dimensions. Conversely, many species of trees yielding light wood of relatively low density, whilst generally having a faster growth rate than the aforementioned trees, possess relatively poor mechanical properties, have only a limited number of end uses and command only a low commercial value.

In addition, sections of trees having a diameter of less than about 20 cm have only a limited application in the aforementioned cutting processes, whilst sections having a diameter less than about 15 cm are of virutally no use in such processes.

Accordingly, it would offer considerable advantages in both cost and time if a process could be found to convert the relatively low diameter sections of trees into aggregates of larger size. Such a process would be most advantageous if the aggregate product were to possess improved mechanical properties compared to those of the starting material.

Previous approaches to this problem have been largely based upon the aggregation of very small pieces of wood, for example chips, strands, particles and wafers, bonded with, for example, synthetic adhesives. The product of these processes, for example chipboard and fibre board, are available commercially. However, the strength of such products is largely dependant upon the strength of the particular bonding agent used.

In addition, a number of proposals have been made for processes based upon the aggregation of very small pieces of wood, but without the addition of a bonding agent. For example, GB 959,375 discloses a process for the production of hardboard, fibreboard or the like comprising shredding rubber wood, treating the shredded wood with boiling water or steam to yield a fibrous pulp and compressing the pulp into the required board. GB 997,798 discloses a wet process for the production of moulded articles from cellulose-containing fibrous materials in which the whole of the fibrous material, having fibres of up to 40 mm in length and up to 3 mm in diameter is opened up, the water removed under pressure in moulds and the resulting mixture allowed to dry under pressure to yield the required product. GB 1,126,493 discloses a process for making board products from sugarcane comprising longitudinally opening the sugar cane stalk without damaging the rind, removing the pith from the rind and subjecting the rind to heat and pressure.

In addition, a number of proposals have been made for processes for treating wood pulp, powdered wood bark, wood chips and/or wood shavings by the action of water, heat and pressure to yield sheet material and-/or moulded products. Such proposals are disclosed in GB 27,048 (1913); GB 659,559; GB 811,533; GB 663,034 and GB 644,503. However, none of the aforementioned proposals is directed to a process which can be applied to the aggregation of sections of trees having a relatively low diameter or to sections of light wood. In each proposal, the fibrous starting material is cut or ground thereby destroying the inherent strength in the starting material resulting from the presence of elongate cellulosic fibres.

Most surprisingly, it has now been found possible to form a cellulosic fibrous aggregate from sections of cellulosic fibrous material without forfeiting, by chopping, the mechanical strength inherent in the longitudinally-extending cellulose fibres of the starting material.

Accordingly, in a first aspect, the present invention provides a cellulosic fibrous aggregate formed from sections of cellulosic fibrous material by a process, which comprises:
a softening stage comprising softening a plurality of sections of cellulosic fibrous material by the action of an aqueous softening agent at elevated temperature thereby at least partially breaking down the cellulosic cross-linking in the cellulosic fibrous material;
a compression stage comprising pressing together the softened sections of cellulosic fibrous material to form a compressed matrix; and
a consolidation stage comprising dewatering and consolidating the compressed matrix to form a consolidated matrix.

The term "section" when used in relation to the starting material for the process used to form the aggregate of this aspect of the present invention is a reference to a portion of cellulosic fibrous material at least 20 cm long and having a cross-section with a dimension of at least 5 mm. Such pieces should be distinguished from the pulp, powder, shavings or chips of the prior art proposals discussed above.

The aggregate of the present invention possesses the advantage that it can be formed from a plurality of sections of cellulosic fibrous material of lesser size. Thus the aggregate is particularly advantageous as it can be formed from sections of trees, such as thin branches and/or the material remaining from large section of trees after cutting to form planks and beams which are of insufficient size for use in the formation of solid wood products. Such material is generally regarded as a waste material. In addition, the aggregate of the present invention possesses the most surprising advantage that it can be formed from sections of relatively low density material, for example light wood having relatively poor mechanical properties, for example stiffness, whilst the aggregate itself possesses much improved mechanical properties than those possessed by such light wood.

The aggregate of the present invention may be formed from any material comprising elongate fibres of cellulose. Thus, the aggregate may be formed from sections of both light and heavy wood, annual fibrous crops, such as flax, jute, kenaf, straw and hemp, the fibrous waste arising from the processing of crops such as sugar cane (bagasse), reeds and grasses, for example elephant grass. The aggregate is particularly advantageous when formed from wood. The sources of wood may be, for example thinnings from plantations, tree branches and tree trunks, particularly those of sufficiently small diameter as to have only limited or no end use, the cylindrical core material residual to the production of veneer by peeling, sections, of sawnwood, and residual material from the cutting of beams and planks from large sections of tree, in particular the splint-wood or sap-wood resulting from the most recent growth of the tree and often discarded as waste. As mentioned above, the aggregate offers the most significant advantage when formed from sections of light wood, often obtained from trees with a high growth rate, in which case a significant improvement in the mechanical properties of the wood results. Examples of species of trees yielding such wood include spruce, poplar, willow, beech, pine and eucalyptus.

A particularly preferred form of the aggregate of this invention is as a laminated aggregate comprising a plurality of layers of the consolidated matrix bonded together by means of an adhesive compound.

Although the direction of the fibres in a layer of the laminated aggregate may be at any angle with respect to that of the adjacent layer(s) it is preferred that either the average fibre direction in a layer is substantially at right angles to that in the adjacent layer(s) or the average fibre direction in each of the layers is substantially the same, that is parallel to one another.

When the direction of the fibres in the individual layers of the laminated aggregate is at right angles to that in the adjacent layer(s) the number of layers will generally be at least three.

The density of the laminated aggregate will be more or less proportional to that of the individual layers of consolidated matrix on which they are based, which density in turn may vary from that of the original starting material of the process to a density of more than 2.5 times the density of said starting material. The mechanical performance properties of the laminated aggregate will not only be related to that of the individual layers, but moreover also to the number of layers and to the direction of the fibres in a layer with respect to that in the adjacent layer(s).

The nature of the adhesive, the presence of which joins the individual layers to provide the laminated aggregate, is not critical and can include any adhesive compound which has sufficient affinity for the carbohydrate structures in the consolidated matrix, thereby providing a sufficiently strong bond between the individual layers. Such adhesive compounds may include physically and chemically reacting compounds. Examples of physically reacting adhesive compounds include, in addition to those of animal, vegetable or mineral origin, synthetic polymeric adhesive compounds. A preferred class of polymeric compounds for use as adhesive in the present laminated aggregate are linear alternating copolymers of at least one olefinically unsaturated compound and carbon monoxide, such as ethylene-carbon monoxide copolymers and ethylene-propylene-carbon monoxide terpolymers. Such polymers are known per se for example from EP-A 121965, EP-A 213671, EP-A 229408 and U.S. Pat. No. 3,913,391; likewise, their methods of preparation by catalytic copolymerization, are known from these references. Examples of suitable chemically reacting adhesives include phenol-formaldehyde-, urea-formaldehyde-, polyurethane- and epoxy resin-based systems. The type of adhesive or adhesive system which will be present in the laminated aggregate will be amongst others governed by the specific requirements for such an aggregate. For example should the aggregate be used in a humid environment or in contact with water, it is preferred to have a water-resistant adhesive present, whereas with aggregates exposed to relatively high temperatures the adhesive should be sufficiently stable under those conditions and should not for example decompose and/or melt.

Although the laminated aggregates will generally be based on layers of consolidated matrix of more or less the same thickness, laminated aggregates may be provided wherein the thickness of one or more of the layers may differ in thickness from that of the other layer(s). The density of the different layers, which layers together comprise the aggregate, will generally be the same. For certain applications however, it may be advantageous for laminated aggregates of the present invention to comprise one or more layers which differ in density with respect to that of the other layers, for example laminated aggregates wherein the two outer layers have a higher density than the layers in between said outer layers.

Although in general the laminated aggregates will be based on flat layers, some uses may require aggregates wherein the layers show a deviation from the principal plane, hereinafter referred to as non-flat aggregates. With such non-flat aggregates the average direction of the fibres in the different layers will preferably be substantially the same.

A further modification of the basic laminated aggregate concept as described hereinbefore are aggregates where one or both of the surfaces have been provided with a profile, which profile may be restricted to the outer layer or may extend to one or more of the adjacent layers of the aggregate.

The laminated aggregates of the present invention may when desired be for example sanded and/or provided with a protective or decorative coating, very similar to the treatment of conventional plywood.

According to a further aspect of the present invention there is provided a process for the preparation of a cellulosic, fibrous aggregate from sections of cellulosic fibrous material, which process comprises a softening stage comprising softening a plurality of sections of cellulosic fibrous material by the action of an aqueous softening agent at elevated temperature, thereby at least partially breaking down the cellulosic cross-linking in the cellulosic fibrous material;

a compression stage comprising pressing together the softened sections of cellulosic fibrous material to form a compressed matrix; and a consolidation stage comprising dewatering and consolidating the matrix to form a consolidated matrix.

The objective of the softening stage is to soften and swell the sections of cellulosic fibrous material, such that the subsequent application of pressure forces together the longitudinal cellulose bundles into larger sections or aggregates. The softening stage of the process is well known per se. The sections of cellulosic fibrous material are softened by the action of an aqueous softening agent at an elevated temperature. The softening agent may be present either as water or as steam. However, softening is facilitated by the inclusion in the aqueous softening agent of certain chemical additives, for example an organic or inorganic acid, such as acetic, nitric or sulphuric acid, alkali metal or alkaline earth metal hydroxides or carbonates, such as sodium hydroxide, calcium hydroxide, sodium carbonate, potassium carbonate, and water-miscible lignin solvents, such as lower alcohols, for example ethanol, or dioxane. Ammonia, either gaseous or in aqueous solution, is known, for example from U.S. Pat. No. 3,282,313, to be an effective softening agent and may form part of the aqueous softening agent of this process. Further, the use as softening agents of such compounds as hydrazine (U.S. Pat. No. 3,894,569), chlorine and formaldehyde is known. However, the use of such compounds requires the use of specialised vessels to contain the compounds and prevent its escape into the atmosphere. It is a feature of the process of this invention that the use of ammonia, and hence such measures, can be avoided. Indeed, the softening stage of the process of this invention is conveniently carried out in an open bath, thereby facilitating the treatment of sections of cellulosic material.

The softening agent is preferably an aqueous solution of an alkali metal or alkaline earth metal hydroxide or carbonate, most preferably sodium hydroxide. The sections of cellulosic fibrous material may conveniently be contacted with liquid softening agents by immersion in a suitably sized bath.

The amount of chemical additive can conveniently be related to the amount of cellulosic fibrous material being treated. For example, 0.02 to 3.0, preferably 0.1 to 1.0, parts by weight of chemical additive, for example sodium hydroxide, are used per 100 parts by weight of material being treated. The softening agent may, under such conditions, when the inclusion of a chemical additive results in an alkali solution, have an initial pH of 10–11 which drops to 8 after a short time, indicating that the agent is consumed.

The softening of the cellulosic fibrous material is effected at elevated temperature. The upper limit of temperature is the temperature at which the cellulosic fibrous material thermally degrades. In general, temperatures in the range of from about 50° C. to 150° C. may be employed, preferably from about 70° C. to 120° C., more preferably from about 80° C. to 100° C.

The softening stage is conveniently effected at atmospheric pressure when using water or an aqueous solution as softening agent at temperatures up to about 100° C., or, when using steam at temperatures above about 100° C., at the saturation vapour pressure of steam at the operating temperature. If desired, however, the softening stage may be effected at increased pressures. In general, the time taken to soften a given cellulosic fibrous material depends upon the severity of the softening conditions. Thus under the action of high temperatures, the softening times are relatively short, typically less than 1 hour at about 150° C. For temperatures in the preferred range of from about 80° C. to 100° C., softening times may be up to 5 hours, or even longer, depending upon the density of the starting material; softening times increasing as the density of the starting material increases. Further, the softening time increases as the dimensions of the sections of material being treated increase.

It has been found that at temperatures in the range of from about 120° C. to 140° C., the presence of the moisture necessary in the softening stage promotes harmful side reactions in the material being treated which can lead to a reduction in the quality of the product. Therefore, it is preferred that the material being treated is held at a temperature within this range for only a short time. If a prolonged time for softening is required, the material should be heated rapidly to a temperature above about 140° C., or, preferably the softening stage should be conducted at a temperature below about 120° C.

The second stage of the novel process involves compressing together the softened branches produced by the first stage. In this compression stage, it is desirable that the moisture introduced in the softening stage should not be wholly expressed, and it is in fact desirable to retain a moisture level of at least 30 to 35% wt (70 to 65% wt dry wood), for effective subsequent consolidation. The pressure applied in this compressing step may be in the range of from 25 to 150 bars, preferably from 30 to 100 bars, about 50 bars usually providing a practical balance of economy and desired product properties. One suitable technique for applying the required pressure (which requires no special means to limit water loss) is to introduce the softened sections of cellulosic fibrous material, either separately or preferably in bunches, into a hydraulic press or between a pair of pressure rollers. It is particularly preferred to feed the branches downwardly through the nip of such rollers. The necessary compression is easier to obtain when the material is warm, preferably at a temperature of from about 80° C. to 170° C., but still possible when cooled to 45° C. However, it is not usually necessary to apply external heating at this stage, since the compression is partially adiabatic and thus generates internal heating within the compressed material. Heated pressure rollers may nevertheless be used provided that excessive moisture loss is avoided.

Without wishing to be bound by theory, it appears that the conditions of the softening stage allow the retention of the strength inherent in the longitudinally-extending cellulose network, present in the starting material while breaking down carbohydrate bonding which provides inter-cellulose cross-linking, and thereby allow the material to be deformed. This is less radial than, say, alkaline pulping. Deformation is essentially radial, axial integrity being retained. The chemical structure which is retained is resistant to heavy mechanical working, and such working may be utilised to increase the inherent processability of the material, and the uniformity and homogeneity of material to be treated further. While the original shape and structure of the starting material are destroyed, a tow-like material can be produced by squeezing the softened branches between grooved, profiled rollers, preferably a sequence of such calendar rollers having successively finer grooves.

The product of rolling is a somewhat loose matrix, intermeshed in the case of rolling a bundle of sections of softened material. The flat, rolled product, an intermediate in the overall process of the invention, can be stored as desired and subjected later to the final stage of the process, for example after some days.

Accordingly, in a further aspect of the present invention there is provided a process for forming a compressed matrix suitable for use as an intermediate in the formation of cellulosic fibrous aggregate from sections of cellulosic fibrous material, which process comprises a softening stage as hereinbefore described and a compression stage as hereinbefore described.

Consolidation of the compressed matrix, is effected accompanied by the removal of moisture by the application of heat and pressure. Techniques and equipment for this purpose are well known in, for example, papermaking; suitable forms being the converging track/belt, where one of the supporting members is either perforated, for example a perforated metal sheet or absorbent, for example a fibrous mat. Alternative types of apparatus include perforated pressure moulds.

The pressure applied to the compressed matrix is conveniently in the range of from 5 to 150 bars, preferably from 5 to 100 bars, 5 to 50 bars often being sufficient. In order to assist the removal of the moisture remaining in the matrix, the consolidation stage is preferably effected at an elevated temperature, typically at least 100° C. A temperature of at least 110° C. is preferred. As discussed above with reference to the softening stage, the cellulosic fibrous material should not be maintained at a temperature of from about 120° C. to 140° C. for prolonged periods of time in the presence of moisture. Accordingly, if it is desired to operate the consolidation stage at a temperature in this range, provision should be made to rapidly remove the residual water in the matrix, for example by the use of perforated moulds. Alternatively, the consolidation stage should be effected at temperatures outside of this range, with higher temperatures being achieved by a rapid heating of the matrix. Of course, the maximum temperature should be kept below that at which significant thermal degradation of the wood occurs. Accordingly, the consolidation stage may be effected at temperatures of up to about 200° C., typically up to about 170° C.

The time required for this stage of the process is dependent on the temperature used and, to a lesser extent, the pressure applied; a period of 15 to 30 minutes being typical in the case of consolidation in a perforated mould at 145° to 170° C. Milder conditions, for example a period of 1 to 3 hours at a temperature of 110° to 120° C. may be more practical in certain circumstances.

The methods according to which the laminated aggregates may be manufactured are not essentially different to those employed in the manufacture of conventional plywood. Such methods typically comprise stacking the desired number of sheets of consolidated matrix having the required dimensions and shape and provided with a sufficient amount of adhesive, and subsequently placing the stacked sheets in a suitable hot press for bonding, for example a press which can accommodate the shape of the laminated aggregate. The temperature and time in the press being related to the nature of the adhesive. Depending on the nature of the adhesive to be used, it can be applied as a liquid or solid and at ambient or elevated temperature. Methods for applying the adhesive to the layers of consolidated matrix include brushing, rolling, spreading, spraying using both conventional as well as electrostatic spraying techniques, while some solid adhesives can also be applied as a sheet or a foil.

The laminated aggregates hereinbefore described are high quality materials, which may suitably be used as construction materials, demonstrating superior performance properties compared to conventional plywood. The nature of their origin and the method of manufacture afford a great deal of flexibility in dimensions of the laminated aggregates; simultaneously their production is independent of the availability of starting materials of sufficient size and quality.

In use, the aggregate of the present invention may be water-sensitive (which may be considered as a reversal of the dewatering stage of its formation). The aggregate may, therefore, be best suited for intended to provide water-resistance. A conventional water-resistant lacquer or other coating or impregnant may be applied.

Alternatively, to render the aggregate resistant to moisture and/or improve its mechanical properties, the aggregate may additionally comprise one or more synthetic polymers. The polymer may be conveniently applied to the surface of the aggregate, for example in the form of a powder or melt. Alternatively, the polymer may be incorporated in the aggregate during its formation, conveniently prior to the final consolidation stage. Suitable polymers for inclusions in the aggregate include those discussed above with reference to the laminated composites.

However, owing to the difficulties associated with the inclusion of some polymers in the bulk of the aggregate and the problems of obtaining a homogeneous product, it is preferred to incorporate into the aggregate, either during its formation or after, one or more monomers and, if necessary, one or more polymerisation catalysts. The aggregate is then subjected to conditions under which polymerisation of the monomer occurs. In this way, the relatively more mobile and easier to handle monomer may be incorporated evenly throughout the aggregate, thus yielding a homogeneous product.

The present invention will now be illustrated in the following specific Examples.

EXAMPLE 1

Fast-grown soft wood branches were debarked and trimmed to operationally convenient dimensions (10 to 150 mm diameter, 0.2 to 1 m long) and soaked for 20 to 2000 min at 90° to 100° C. in an aqueous solution of sodium hydroxide (1 to 3% by weight sodium hydroxide based on the weight of wood), followed by downwards passage through a series of pinch rollers having successively narrower grooves, to produce a tow-like material. This material was consolidated for 2 hours in perforated moulds at 130° C., the moulds allowing for a rapid removal of the residual water in the material. The consolidated material was subjected to a pressure of 50 to 150 bar, to give an even product and to remove air, and then consolidated/dewatered at 5 to 15 bar.

The mechanical properties of the resulting aggregates were then measured, and compared with the untreated wood, and also with samples of untreated heavy wood (teak), particle board and plywood. The results are set out in Table I below.

TABLE I

| Material | Density (kg/m$^3$) | Stiffness (GPa) | Bending Strength (MPa) | Tensile Strength (MPa) |
| --- | --- | --- | --- | --- |
| Willow (untreated) | 450 | 4.5 | 60 | 71 |
| Willow (treated) | 820 | 10.7 | 120 | 115 |
| Willow (treated) | 1300 | 10.9 | 125 | 135 |
| Eucalyptus (untreated) | 750 | 11.0 | 150 | |
| Eucalyptus (treated) | 1300 | 21.0 | 270 | |

TABLE I-continued

| Material | Density (kg/m³) | Stiffness (GPa) | Bending Strength (MPa) | Tensile Strength (MPa) |
|---|---|---|---|---|
| *Pinus Radiata* (untreated) | 480 | 7.0 | 58 | 79 |
| *Pinus Radiata* (treated) | 1230 | 9.6 | 115 | |
| Beech (untreated) | 750 | 11.5 | 105 | 98 |
| Beech (treated) | 1030 | 22.6 | 150 | 130 |
| Beech (treated) | 1130 | 24.0 | 140 | 214 |
| Particle Board | 700 | 2.1 | 14 | 16 |
| Plywood | 630 | 4.7 | 63 | 27 |
| Teak | 700 | 13.0 | 120 | 115 |

From Table I, it can clearly be seen that the aggregates of the present invention possess significantly improved mechanical properties compared to the properties of the corresponding starting material.

EXAMPLE II

Laminated aggregate composites having dimensions 240×50×15 mm, were prepared from layers of substantially unidirectional consolidated matrices having a thickness of approximately 2.5 mm. The layers had been prepared from willow or spruce branches according to the process as described in Example I. Six layers of the relevant wood type were stacked on top of one another and introduced in a mould, after the first five layers had been provided, on one side, with a thermoplastic or thermosetting adhesive. The thermoplastic adhesive, which was applied as a powder with the aid of electrostatic spraying equipment, was an ethylene-propylene-carbon monoxide polymer having a melting point 220° C. The thermosetting adhesive was an "EPIKOTE 828" (trade name) "EPIKURE 213" (trade name) 55/45 wt/wt blend, and was applied by spatula to the relevant layers. The laminates based on the thermoplastic adhesive were bonded at 190° C. and under an initial pressure of 80 bar, which pressure tended to drop with time. When the pressure in the mould had become constant (after approximately 15 minutes had elapsed) the heating was stopped and water-cooling switched on and the mould and laminate were cooled to approximately 20° C. With the thermosetting adhesive, bonding was achieved by heating in a mould to 80° C. under a slight pressure of from 5 to 7 bar. After the composite had reached the temperature of 80° C., heating was switched off and the composite was allowed to cool overnight.

From the laminates thus obtained samples for testing were cut having the dimensions 170×20×15 mm. The density of these samples was calculated from their weight and dimensions, while some physical characteristics were determined via ISO-178. The composition of the laminates and the corresponding data are given in Table II below together with that of a number of comparative samples based on natural wood and wood products.

From the results in Table II it follows that the laminated aggregate composites of the present invention, which find their origin in waste wood material of relatively low density demonstrate superior performance characteristics compared to samples of natural wood cut to size from, for example treetrunks, as well as to conventional wood products such as plywood and particle board.

TABLE II

| Composite Woodtype | Adhesive % wt of composite | Density kg/m³ | Performance properties | |
|---|---|---|---|---|
| | | | Stiffness GPa | Bending Strength MPa |
| Willow | 6 TPA* | 1170 | 13 | 101 |
| Willow | 11 TPA* | 1370 | 12.8 | 104 |
| Spruce | 8 TPA* | 1220 | 10.8 | 81 |
| Willow | 10 TSA** | 1300 | 27 | 180 |
| Comparative samples | | | | |
| Willow (untreated) | | 450 | 4.5 | 55 |
| Spruce (untreated) | | 500 | 7 | 70 |
| Oak/beech/teak (untreated) | | 650–800 | 9–14 | 95–120 |
| Plywood | | 650 | 5 | 60 |
| Particle board | | 750 | 3.5 | 30 |

*Thermoplastic adhesive
**Thermosetting adhesive

We claim:

1. A cellulosic fibrous aggregate formed from sections of cellulosic fibrous material by a process which comprises:
   a softening stage comprising softening a plurality of sections of cellulosic fibrous material at least 20 cm long by the action of an aqueous softening agent at elevated temperature, thereby at least partially breaking down the cellulosic cross-linking in the cellulosic fibrous material;
   a compression stage comprising pressing together the softened sections of cellulosic fibrous material to form a compressed matrix; and
   a consolidation stage comprising dewatering and consolidating the compressed matrix to form a consolidated matrix.

2. An aggregate as claimed in claim 1, wherein the sections of cellulosic fibrous material are sections of light wood.

3. An aggregate as claimed in either of claims 1 or 2, being a laminated aggregate comprising a plurality of layers of the consolidated matrix bonded together by means of an adhesive compound.

4. An aggregate as claimed in claim 3, wherein the adhesive compound is a linear alternating copolymer of at least one olefinically unsaturated compound and carbon monoxide.

5. An aggregate as claimed in claim 2, being a laminated aggregate comprising a plurality of layers of the consolidated matrix bonded together by means of an adhesive compound.

6. A cellulosic fibrous aggregate prepared by softening a plurality of sections of cellulosic fibrous material at least 20 cm long by the action of an aqueous softening agent at elevated temperature from about 50° C. to about 150° C., thereby at least partially breaking down the cellulosic cross-linking in the cellulosic fibrous material, compressing together the softened sections of cellulosic fibrous material to form a compressed matrix, and dewatering and consolidating the compressed matrix to form a consolidated matrix.

7. A process for the preparation of a cellulosic fibrous aggregate from sections of cellulosic fibrous material, which process comprises the steps of:
   softening a plurality of sections of cellulosic fibrous material at least 20 cm long by the action of an aqueous softening agent at elevated temperature, thereby at least partially breaking down the cellulosic cross-linking in the cellulosic fibrous material;

compressing together the softened sections of cellulosic fibrous material to form a compressed matrix; and dewatering and consolidating the compressed matrix to form a consolidated matrix.

8. A process as claimed in claim 7, wherein the softening agent comprises an aqueous solution of an alkali metal or alkaline earth metal hydroxide or carbonate.

9. A process as claimed in claim 8, wherein the softening agent comprises an aqueous solution of sodium hydroxide in an amount of 0.02 to 3.0 parts by weight per 100 parts by weight of cellulosic fibrous material being treated.

10. A process as claimed in any one of claims 7 to 9, wherein the softening stage is effected at a temperature in the range of from about 50° C. to 150° C.

11. A process as claimed in claim 8, wherein the softening stage is effected at a temperature in the range of from about 80° C. to about 100° C.

12. A process as claimed in any one of claims 7 to 9 or 11, wherein the compression stage is effected at a pressure in the range of from 25 to 150 bars.

13. A process as claimed in any one of claims 7 to 9 or 11, wherein the compression stage is effected at a pressure in the range of from 25 to 150 bars, and the compressed matrix has a moisture content of at least 30 to 35% by weight.

14. A process as claimed in any one of claims 7 to 9 or 11, wherein the compression stage is effected at a pressure in the range of from 25 to 150 bars, the compressed matrix has a moisture content of at least 30 to 35% by weight, and the compressed matrix is consolidated at a pressure in the range of from 5 to 150 bars.

15. A process as claimed in any one of claims 7 to 9 or 11, wherein the compression stage is effected at a pressure in the range of from 25 to 150 bars, the compressed matrix has a moisture content of at least 30 to 35% by weight, the compressed matrix is consolidated at a pressure in the range of from 5 to 150 bars, and the compressed matrix is consolidated at a temperature of at least 110° C.

16. A process as claimed in any one of claims 7 to 9 or 11, wherein the compression stage is effected at a pressure in the range of from 25 to 150 bars, the compressed matrix has a moisture content of at least 30 to 35% by weight, the compressed matrix is consolidated at a pressure in the range of from 5 to 150 bars, the compressed matrix is consolidated at a temperature of at least 110° C., and comprising the additional steps of stacking the desired number of layers of consolidated matrix having the required dimensions and shape, applying a sufficient amount of adhesive, and placing the stacked sheets in a suitable press to provide bonding, thereby yielding a laminated aggregate.

17. The process according to claim 16, wherein the adhesive compound is a linear alternating copolymer of at least one olefinically unsaturated compound and carbon monoxide.

18. A process as claimed in claim 10, wherein the compression stage is effected at a pressure in the range of from 25 to 150 bars.

19. A process as claimed in claim 10, wherein the compression stage is effected at a pressure in the range of from 25 to 150 bars, and the compressed matrix has a moisture content of at least 30 to 35% by weight.

20. A process as claimed in claim 10, wherein the compression stage is effected at a pressure in the range of from 25 to 150 bars, the compressed matrix has a moisture content of at least 30 to 35% by weight, and the compressed matrix is consolidated at a pressure in the range of from 5 to 150 bars.

21. A process as claimed in claim 10, wherein the compression stage is effected at a pressure in the range of from 25 to 150 bars, the compressed matrix has a moisture content of at least 30 to 35% by weight, the compressed matrix is consolidated at a pressure in the range of from 5 to 150 bars, and the compressed matrix is consolidated at a temperature of at least 110° C.

22. A process as claimed in claim 10, wherein the compression stage is effected at a pressure in the range of from 25 to 150 bars, the compressed matrix has a moisture content of at least 30 to 35% by weight, the compressed matrix is consolidated at a pressure in the range of from 5 to 150 bars, the compressed matrix is consolidated at a temperature of at least 110° C., and comprising the additional steps of stacking the desired number of layers of consolidated matrix having the required dimensions and shape, applying sufficient amount of adhesive, and placing the stacked sheets in a suitable press to provide bonding, thereby yielding a laminated aggregate.

* * * * *